(12) United States Patent
Albrecht et al.

(10) Patent No.: US 6,512,108 B2
(45) Date of Patent: Jan. 28, 2003

(54) FAT IMPERVIOUS FOILS AND COATINGS

(75) Inventors: Rotraut Albrecht, Wolfen (DE); Silvio Boettcher, Langeneichstaedt (DE); Gernod Haerter, Bobbau (DE); Peter Pawlak, Zscherndorf (DE); Erich Heinrich Schwartze, Gronau (DE); Heike Zuleg, Wolfen (DE)

(73) Assignee: Gesellschaft fuer Spezialfolien-Entwicklung m.b.H., Wolfen (DE)

( * ) Notice: Subject to any disclaimer, the term of this patent is extended or adjusted under 35 U.S.C. 154(b) by 0 days.

(21) Appl. No.: 09/794,425

(22) Filed: Feb. 27, 2001

(65) Prior Publication Data

US 2001/0009132 A1 Jul. 26, 2001

Related U.S. Application Data

(63) Continuation-in-part of application No. 09/276,272, filed on Mar. 25, 1999, now Pat. No. 6,214,452.

(30) Foreign Application Priority Data

Mar. 26, 1998 (DE) .......................................... 198 13 229

(51) Int. Cl.⁷ ..................... C09D 103/08; C09D 103/18; C08B 31/10
(52) U.S. Cl. ....................................................... 536/111
(58) Field of Search ........................ 536/111; 106/206.1

(56) References Cited

U.S. PATENT DOCUMENTS

| | | | | |
|---|---|---|---|---|
| 3,705,891 A | * | 12/1972 | Tuschhoff et al. | ........ 106/206.1 |
| 3,725,386 A | * | 4/1973 | Hanson et al. | ........... 106/206.1 |
| 4,281,111 A | * | 7/1981 | Hunt et al. | ................. 536/111 |
| 5,374,304 A | * | 12/1994 | Frische et al. | .............. 106/210 |
| 6,214,452 B1 | * | 4/2001 | Albrecht et al. | ............ 428/220 |

* cited by examiner

Primary Examiner—David Brunsman
(74) Attorney, Agent, or Firm—Karl Hormann

(57) ABSTRACT

A substantially fat impervious coating (KIT number from about 6 and about 16) coating made from an aqueous solution of a hydroxypropyl high amylose pea starch.

13 Claims, No Drawings

FAT IMPERVIOUS FOILS AND COATINGS

REFERENCE TO PRIOR APPLICATION

This is a continuation-in-part of application Ser. No. 09/276,272 filed Mar. 25, 1999, now U.S. Pat. No. : 6,214,452 B1 issued Apr. 10, 2001.

BACKGROUND OF THE INVENTION

1. Field of the Invention

The invention, in general, relates to films or foils and products made from, or incorporating, foils or coatings and, more particularly, to such products made from aqueous solutions of starch or amylose derivatives of the kind useful as fat impervious coatings of otherwise pervious or wettable packages made of paper, card board and the like.

2. The Prior Art

Films, foils and foil products, hereinafter sometimes collectively referred to as foils, are produced in huge quantities. Since a considerable quantity of such foils is intended for single time use only and since, following such use, the foils are usually discarded, there is an increased demand for foils which can either be recycled or which are biodegradable. Recycling is, however, sometimes made difficult since such foils, because of their great variety, can often not be distinguished and sorted by laymen or consumers for subsequent recycling processes. Foils which are fully biodegradable or compostable within a reasonable time would, of course, constitute an ideal alternative to conventional foils and would very likely eventually replace those conventional foils which are not biodegradable or compostable, such as polyvinyl chloride, polystyrene, polyethylene, etc., if they could be made to posses similar properties, especially in terms of transparency, mechanical strength and stability as well as unidirectional or bidirectional imperviousness, as the case may be, in respect of predetermined substances.

Heretofore, numerous experiments have been conducted in which starch was used as a base or raw material for producing bio-degradable films or foils. However, products made from pure starch have thus far not been able effectively to compete with conventional products made from synthetic polymers. Their low tear strength and extensibility as well as their lack of transparency and stability are drawbacks which have prevented use of those products on any significant scale.

To overcome the disadvantages and, more particularly, to improve the mechanical properties of starch-based foils, it has been proposed (see, e.g. German patent 1,745,680) to add to the starch various softeners such as sorbite, glycerine, polyvinyl alcohol and so forth. Another way of improving the mechanical properties of starch-based products of the kind here under consideration is to add polyolefin-based synthetic polymers. For Instance, WO 90/14388 discloses a biodegradable plastic formed from corn starch and low-density polyethylene. The improvements brought about by such products have not, however, been such as to result in serious alternatives to synthetic polymers.

Another attempt to avoid, or at least lessen, the mentioned disadvantages was made by using so-called special amyloses such as, for instance, chemically modified high amyloses. For example, certain hydroxyalkyl derivatives of amylose may be processed into thermoplastic articles or foils, films and membranes, or hydroxypropyl starches may be added to other polymers, with a view to attaining improvements in predetermined properties. Thus, U.S. Pat. No. 3,850,652 relates to a specific application and teaches a multi-purpose membranous material of high flexibility and mechanical strength formed at least in part of a hydroxypropyl starch. Whilst this multi-purpose membranous material may be immune from being absorbed by other materials in contact therewith or vice versa, it is neither transparent nor completely biodegradable.

As described in EP 0,417,828, hydroxypropyl starches have also been used to improve the biological degradation behavior of products made from unsaturated hydrocarbon polymer compounds which would otherwise be difficult to decompose biologically. However, the properties of such products have by no means been satisfactory. Whilst the products may be generally transparent, they nevertheless display some slight brownish tinge, and they are of insufficient mechanical strength. Furthermore, U.S. Pat. No. 3,778,392 describes a mixture of polymeric starch and hydroxypropyl starch for use in connection with high-quality papers. These products are not biodegradable and involve comparatively complex manufacturing processes.

As regards their utility, none of the known products derived from starch or amylose have developed into products which effectively compete with comparable synthetic polymer products. Moreover, additives and softeners added to the starch or amylose often prevent complete biodegradability of the final product.

OBJECTS OF THE INVENTION

It is an object of the invention to provide foils or products thereof made from starch or amylose derivatives without added synthetic materials.

Another object is to provide foils or products thereof made from starch or amylose derivatives without added softener.

Still another object is to provided foils and the like made from starch or amylose derivatives which are qualitatively significantly superior to known foils of this kind by providing improved physical and mechanical properties.

It is a particular object of the invention to provide foils and the like made from starch or amylose derivatives which are of superior tear strength and extensibility as well as high transparency.

It is also an object of the invention to provide foils and films made from starch or amylose derivatives which may be used as overhead projection slides or printable films.

Yet another object of the invention resides in the provision of foils and films which may be used as surface coatings or laminates of paper and cardboard.

Still further, it is an object of the invention to provide a compound made from starch or amylose derivatives which may be deposited on a surface by spraying, spreading or pouring to form a foil or film thereon.

It is a further object of the invention to provide a compound from starch or amylose derivatives suitable as a surface coating of paper and the like to improve the surface quality thereof.

It is yet another object of the invention to provide a compound derived from starch or amylose derivatives which is completely biodegradable.

Another important object of the invention is to provide a laminate consisting of paper coated by a compound derived from starch or amylose derivatives to provide a substantially fat impervious food wrapping material.

A still further particular object of the invention is to provide a laminate incorporating a layer of a starch or amylose derived substance to provide a high degree of imperviousness to fat or fatty substances.

Still another object of the invention resides in the provision of a material suitable for coating a support layer made of paper, cardboard or similar materials to render it substantially impervious to fat or fatty substances.

Other object will in part be obvious and will in part appear hereinafter.

SUMMARY OF THE INVENTION

In accordance with the invention, there is provided a compound derived from a starch or amylose derivative of low salt content and dissolved in ether, the derivative having a mean molecular weight of between about $10^5$ and about $2 \times 10^7$ g/mol, a degree of substitution between about 0.1 and 0.5, a substantially uniform distribution of substituents between the $C_2/C_3$ and $C_6$ within their glucose unit, a water content of less than 25% under normal climatic conditions, a polydispersity from about 2 to about 8, and a predominantly amorphous structure with a low crystalline proportion and a predominant particle size not greater than 400 nm.

In a further advantageous embodiment of the invention the basic material has an amylose content of not less than 60%.

Other advantageous embodiments will become apparent to those skilled in the art as the description unfolds.

It has surprisingly been found that foils and products made thereof possessing the above parameters and made from pure starch or amylose derivatives without any additives have excellent mechanical properties and a high degree of transparency. Due to the fact that the foils and products made from them do not incorporate any synthetic additives or softeners they are completely biodegradable.

Particularly advantageous results are attained if the basic material, i.e. the starch, is derived from the group of high amylose starches and if its amylose content is not less than 60%.

The inventive parameters of the derivative, viz. low salt content, mean molecular weight between about $10^5$ and about $2 \times 10^7$ g/mol, polydispersity of about 2 to about 8, a degree of substitution of 0.1 to 0.5 and preferably from 0.1 to 0.3, substantially uniform distribution of substituents between the $C_2/C_3$ and $C_6$ bond sites within the glucose unit and a low proportion of hard-to-dissolve components are obtained by a careful hydroxypropylation and desalination. Following the hydroxypropylation and desalination the derivative will be a colloidal, visco-elastic solution which may be further processed by known processes such as casting, spraying, spreading and the like into foils and products made thereof with a predominantly amorphous structure of low crystallinity and a mean particle size of 400 nm below the limits of visibility, the latter being an important requirement for the high degree of transparency of the foil or products made from it. The water content of the foil significantly influences its mechanical properties. Under normal climatic conditions, it is below 25 percent by weight. The foils are of high transparency and, compared to conventional foils and foil products made from starch or amylose derivatives, are of significantly improved stability and extensibility. Owing to the relatively constant water content of the foils or foil products, these properties remained substantially unchanged even after long storage periods at a relative humidity between about 30% and about 70% and at a temperature of about 23° C.

The foils and foil products in accordance with the invention have an internal as well as an external plasticization effect which may on the one hand be ascribed to enlarged spaces between individual macromolecule resulting from the chemical addition of sterically large side groups which lead to increased movability of the polymer chains. On the other hand, it may be ascribed to low molecular groups into which the hydroxypropylated amylose may easily penetrate or physically bonded, thus acting as external softeners. In the present case, the low molecular groups are, in fact, water acting as a softener.

In this connection, the starch concentration or overlapping density of starch molecules is of great significance as it determines the way and progress in which the water molecules penetrate or are physically bonded. Thus, the mechanical properties are influenced as well.

Accordingly, the foils or products made thereof in accordance with the invention require no softeners or additives. This results in a complete biodegradability or compostability of the foils and products. It also prevents the foils or foil products from becoming brittle. Furthermore, materials in contact with the foil or foil product cannot be detrimentally affected by migration of a softener. The mechanical stability of the foils in the range of relative humidity from about 30 to about 70% at a temperature of about 23° C. is excellent.

The predominantly amorphous structure and a predominant particle size below 400 nm impart excellent optical properties to the foil or foil product. The degree of transmission at light in the range of 560 nm was up to about 93%. The foils are, therefore, especially well suited as overhead projection slides. They may also be used as data carriers for they may be written or printed upon. They may also be used as copy surfaces. The mentioned properties make the foils particularly well suited for ink jet printing. To this end, a surface of a support material may be enhanced or refined by applying to it a coating of an aqueous solution of starch or amylose derivative. Suitable carrier materials are cellulose or other natural fibers. Of course, synthetic support materials may be used as well; but it should be understood that it would probably interfere with the biodegradability of the foil product.

It is also an aspect of the invention to utilize an appropriately constituted starch or amylose derivative in the manufacture of paper and cardboard in order to improve not only their mechanical and optical properties but also their surface characteristics.

Preferably, the foils or film coatings in accordance with the invention have a thickness between about 20 and 200 μm; and their preferred density lies in the range of 1.3 g/cm³.

The properties of the foils and foil products in accordance with the invention may be summarized as follows:

They have a tensile strength >40 Mpa (megapascal) at normal climatic conditions and thus they clearly exceed conventional foils made from starch with a high amylose content as well as 81/15 copolymer lactide/caprolactone (22.0 MPa) and soft polyvinyl chloride (16–34 MPa);

Their elongation at break is up to 60 Mpa and they are thus superior to low density polyethylene (longitudinal 18–32 MPa; transversal 16–25 MPa) as well as medium and high density polyethylene (longitudinal 20–40 MPA; transversa 15–30 MPA);

Their E module is between about 10 to about 40 MPA;

They possess high transparency (>80% at light of a wavelength of about 560 nm);

They have a high blocking efficiency as regards gases, especially nitrogen and oxygen;

They may be stored at relative humidity levels between about 30% and about 70% at a temperature in the range of about 23° C.;

They are stable against discolorations at temperatures up to 170° C. for 15 minutes;

They may be welded, deep drawn, written, printed or copied upon;

They have excellent adhesive and bonding properties when applied from an aqueous solution onto a carrier material such as, for instance, cellulose or natural fibers, and they markedly improve the surface characteristics thereof; and In preferred embodiments they are free of any softeners or synthetic additives and completely biodegradable as defined by E-DIN 53 739 in view of the fact that they are biological polymers.

Given their mentioned properties, the foils and foil products in accordance with the invention, for specific applications, constitute genuine alternatives to foils or foil products made from synthetic polymers such as polyvinyl chloride, polyethylene or polystyrene. If the foils and foil products are used in connection with other materials, their biodegradability does, of course, also depend upon those other materials.

In order to impart specific properties to the foils or foil products predetermined materials or material systems may be added which are not biodegradable. In such circumstances the complete biodegradability relates only to the foils and foil products in accordance with the invention.

It has surprisingly been found that, if properly constituted, starch or amylose derivatives in accordance with the invention have excellent properties in respect of fat imperviousness. Indeed, their KIT numbers (UM557) vary between 6 and 12, the latter being a value which can either not be achieved at all with conventional coating compositions or at best with significant difficulty. While the fat imperviousness of the amylose derivatives, as coatings on such porous substances as paper or cloth, is remarkable, they biodegrade relatively quickly when brought into contact with water. As coatings on paper-based wrappers for food having a high fat content but low water content, such as, for instance, biscuits or crackers, chocolate and other sweets, as well as for dry foods for humans and dry animal feed, the amylose derivatives have been found to be of exceptional quality. Coatings of amylose derivatives on otherwise porous base materials possess excellent qualities of imperviousness in respect of fat or fatty substances in environments where imperviousness against water vapors is of secondary importance, as is often the case with food wrappers.

DESCRIPTION OF PREFERRED EMBODIMENTS

The invention will hereafter be described in greater detail on the basis of preferred embodiments.

In the following examples, the basic material is a slightly yellow powder-like starch derived from peas and has:

- a water content of about 11.5 percent by weight, it being understood that the water content is a function of storage conditions;
- an amylose content of about 77.4%;
- a protein content of about 0.9%; and
- a median molecular weight between about $10^5$ and about $2 \times 10^7$ g/mol.

As is well know and in the context of the invention herein described, amylose may be defined as a sol substituent of starch and consists of straight chain glucose molecules.

Having regard to the utilization of amylose derivatives as coatings for fat impervious laminates, those consisting of a starch derived with an alkylene oxide such as, for instance, propylene oxide have been found to be of particular advantage. In this connection, starches having a high proportion of amylose are preferred. An especially suitable derivative proving an enduring internal softening effect is hydroxypropylether starch in the range of about 0.05 to about 1.5 and preferably in the range between about 0.1 and 1.0.

EXAMPLE I

Following hydropropylation with propylene oxide a derivative of pea starch is obtained as a solution which is turbid, colloidal to coarsely dispersive and visco-elastic. The degree of substitution DS of the derivative is DS=0.2 and the degree of molar substitution MS=0.39. Reaction of the propyleneoxide was uniformly carried out with the hydroxyl groups in the $C_2/C_3$ positions and with the hydroxyl groups in the $C_6$ position. The electric conductivity of the low salt content turbid solution was 329 $\mu$S/cm. A foil was produced from this homogenous bubble-free solution by a well-known pouring process. Neither softeners nor other additives were added. The foil thus obtained had a layer thickness of 30±2 $\mu$m and was brightly transparent. Its light transmissivity at a wavelength of about 560 $\mu$m was T=93.2%. An examination of the foil revealed substantially only particles of a size <400 nm, i.e. particles below the limits of visibility. 90% of the foil was water soluble and had a median molecular weight of 109000 g/mol with a bimodal molar weight distribution.

The density of the foil at 24° C. and relative humidity of 47% was 1.35 g/cm³. The foil was equilibrated at normal climatic conditions and had a water content of 9.43 percent by weight. Subjecting the foil to heat at 170° C. in a drying chamber for 15 minutes did not result in any visible brown discoloration.

The mechanical parameters of the foil set forth in Table 1 were determined at climatic data of 23/27; 23/50 and 23/70 (° C./relative humidity). Surprisingly, the foil exhibits markedly higher stability values than those of known starch foils without additives. As expected, the tensile and tear strengths increased as relative humidity was reduced. By contrast, the extensibility did not show any unambiguous correlation. While the tensile extensibility is at a maximum value at 37% relative humidity, the tear strength attains its maximum value at 50% relative humidity. The foil can be stored for several months without loss of its qualitative properties at about 20° C. to about 25° C. room temperature and at a relative humidity of about 30 to about 70%. On moist soil, the foil will completely disintegrate within about 1 to about 3 hours. The foil may be written on and is suitable, as a substitute for high-priced polyvinyl alcohol, for dosage packaging or medicinal capsules.

EXAMPLE II

The starch derivative solution of Example I, at a concentration of >20 percent by weight, was applied as a thin layer on a paper or cardboard base and dried thereon. The laminate thus obtained had a surface with a shiny surface and was well suited as a printing surface for ink jet printers.

EXAMPLE III

A foil with a thickness of 90±8 $\mu$m was formed by casting a starch derivative solution made in accordance with Example I without adding softeners or other additives. The foil was brightly transparent and, at a wavelength of about 560 nm, its transmissivity was about T=92.7%. The median molecular weight of the foil was 2,158,000 g/mol at a bimodal molar weight distribution.

The foil which was equilibrated under normal climatic conditions was found to have a water content of 10.87 percent by weight. The mechanical parameters of the foil contained in the table were determined at climatic data of 23/37, 23/50 and 23/70 (° C./relative humidity).

As in the case of Example I, the foil was found to have strength values markedly superior to conventional starch foils without additives.

The foil could be stored for several months without loss of its qualitative properties. On moist soil it was found completely to disintegrate within 1 to 3 hours.

The foil could be written or printed on by several media. It could also be fed through a printer or copier and, therefore, it was suitable for use as overhead projection slides. It was found to be of particular advantage in connection with ink jet printers.

Following appropriate preconditioning the foil was also suitable for deep drawing or thermoforming. Such processes did not result in loss of the high degree of transparency of the foil. The foil is particularly well suited as a biodegradable blister material.

Further tests with starch and amylose derivative substances surprisingly revealed their excellent properties as fat barriers when used as coatings on otherwise porous support materials such as paper or cardboard of the kind conventionally used as food wrapping materials. It was found that by applying at least one coating of a solution of a starch or amylose derivative to a porous support material excellent fat imperviousness resulted.

The fat imperviousness may be ascribed to the properties of the starch derivative. Fat imperviousness ranging, in KIT numbers (UM557) from about 6 to about 12 and above, was achieved. These values are significantly higher than those of conventional systems. Laminates incorporating a coating of a solution in accordance with the invention have been found to be particularly suited as wrappings for fatty or greasy food products and animal feed of low water contents. Formed into folding boxes or bags, the laminates were found to form effective and fat impervious wrappers for biscuits or crackers, chocolate and other sweets.

In particular, solutions of starch derived by an alkylene oxide such as, for example, propylene oxide, are particularly suitable. Particularly preferred starches are those of a high amylose content. Hydroxypropylether starch based upon starch with a high amylose content derived from peas was found to be particularly useful. At suitable degrees of substitution in the range from about 0.05 to about 1.5, preferably from about 0.1 to about 1.0, the starch derivative was found to yield a lasting internal softener effect.

For obvious reasons, any coating applied to a substrate or support layer should be cohesive or uninterrupted, i.e. free of fissures and the like. Provided the surface of a substrate is sufficiently smooth, very thin layers of about 6 g/m² were found to provide an acceptable degree of fat imperviousness. The starch derivative may be applied as a coating by various well-known processes. It may, for instance, be applied as a self-supporting layer. Other methods of applying the coating are by applying an aqueous solution of a sufficiently high solids content by a doctor blade, by spraying, coating rollers or extruding. Following coating, the water contents of the solution is preferably reduced to <25% by weight. With a view to improving elasticity, long time stability or water stability, additives well-known in the art may either be added to the derivative solution or be applied subsequent to the coating.

An aqueous solution of a hydroxypropylether starch, in particular of a high amylose pea starch having a solids content of from about 12 to about 20% by weight and a degree of substitution of from about 0.1 to about 1.0, made by an autoclave process was found to be of particular advantage for use in accordance with the invention. To this end, the high amylose pea starch is disintegrated in an aqueous alkaline liquor and is then immediately modified with propylene oxide before neutralization. Any interfering inhomogeneities present in the starch derivative solution are removed by mechanical separation, and the salt content of the starch ether solution inherent in the fabrication process is significantly reduced by ultra filtration. The level of solids content needed for the further processing is set at low temperatures. The solution made in this manner is then preferably applied at room temperature.

The particularly gentle and continuous low-temperature processing of the starch derivative solution has a very positive effect on the coating of the support material. As a result of the cold water solubility following neutralization, separation, filtration and upgrading, the solution may be applied such that no or no more than negligible decomposition reactions will occur.

EXAMPLE IV

A hydroxypropyl starch having a degree of substitution (DS) of 0.17 and a molecular weight of 2,158,000 g/mol is prepared from a high amylose pea starch consisting of 73.6% amylose, 0.9% protein and 13.7% water. In aqueous solution having a solid content of 10%, the hydroxypropyl starch displayed the following properties:

| | |
|---|---|
| viscosity at 25° C. | 143 mPas (millipascal seconds) |
| soluble proportion | 98% |
| conductivity | 140 µS/cm (microsiemens/Centimeter) |
| pH value | 8.55 |
| refractive index | 1.368. |

In a layer forming device the aqueous solution is applied at 90° C. at a layer thickness of 4 g/m². The fat imperviousness of the wrapping material obtained in this manner had KIT number of 16. Such packing materials are particularly suitable for packaging dry fatty animal feed and, in the field of packaging human food, for biscuits or crackers.

TABLE 1

| Sample | Clime | Casting Direction | Thickness [µm] | Tensile Strength | Extensibility Eps (Fmax) [%] | Tear Strength [Mpa] | Tear Extens. [%] | Module Max. [Mpa/%] | L-Module Max. [%] |
|---|---|---|---|---|---|---|---|---|---|
| Ex. 1 | 23/37 | tranverse | 31 | 53.74 | 6.58 | 41.60 | 13.98 | 24.52 | .63 |
| | | longitudin. | 30 | 50.54 | 6.38 | 39.65 | 8.95 | 24.51 | .35 |
| | 23/50 | transv. | 30 | 46.42 | 4.50 | 28.81 | 19.92 | 25.34 | .55 |
| | | longit. | 29 | 46.27 | 4.41 | 31.53 | 13.65 | 25.39 | .43 |
| | 23/70 | transv. | 32 | 36.13 | 4.91 | 21.51 | 12.42 | 18.40 | .60 |
| | | long. | 30 | 33.74 | 3.82 | 24.41 | 5.59 | 17.90 | .77 |

TABLE 1-continued

| Sample | Clime | Casting Direction | Thickness [μm] | Tensile Strength | Extensibility Eps (Fmax) [%] | Tear Strength [Mpa] | Tear Extens. [%] | Module Max. [Mpa/%] | L-Module Max. [%] |
|---|---|---|---|---|---|---|---|---|---|
| Ex. 3 | 23/37 | transv. | 86 | 57.19 | 7.02 | 47.79 | 12.25 | 26.37 | .31 |
| | | long. | 86 | 55.80 | 6.49 | 44.38 | 8.88 | 26.37 | .18 |
| | | transv. | 90.4 | 44.32 | 4.71 | 30.60 | 16.81 | 22.93 | .26 |
| | | long. | 90.2 | 43.60 | 4.67 | 28.49 | 13.66 | 22.83 | .20 |
| | | transv. | 98 | 43.55 | 4.79 | 25.57 | 16.09 | 22.46 | .28 |
| | | long. | 98 | 41.95 | 5.47 | 28.89 | 18.71 | 20.89 | .43 |

What is claimed is:

1. A fat impervious coating composition, comprising:
an aqueous solution of a desalinated hydroxypropylether starch having a solids content of from about 10 to about 20% by weight and a degree of substitution from about 0.1 to about 1.0.

2. The coating composition of claim 1, wherein the starch comprises high amylose pea starch.

3. The coating composition of claim 2, wherein the amylose pea starch is disintegrated in an aqueous alkaline liquor and modified by propylene oxide before neutralization.

4. The coating composition of claim 3, wherein inhomogeneities are removed by mechanical separation and salinity is reduced by ultra filtration.

5. The coating composition of claim 4, comprising an aqueous solution of hydroxypropyl starch having a degree of substitution of 0.17 and a molecular weight of 2,158,000 g/mol and prepared from high amylose pea starch consisting of about 73.6% amylose, 0.9% protein and 13.7% water.

6. The coating of claim 5, wherein the aqueous solution has a solids content of 10% and a viscosity at 25° C. of about 143 mPas.

7. The coating composition of claim 6, wherein the soluble proportion of the solution is 98%.

8. The coating composition of claim 7, wherein the conductivity of the aqueous solution is about 140 $\mu$S/cm.

9. The coating composition of claim 8, wherein the pH value of the aqueous solution is 8.55.

10. The coating composition of claim 9, wherein the refractive index of the aqueous solution is 1.368.

11. The coating composition of claim 10, providing for a KIT number of from about 6 to about 16 when applied to a substrate.

12. The coating composition of claim 11, wherein the KIT number is 16 at a layer thickness of the aqueous solution of 4 g/m$^2$.

13. The coating composition of claim 11, wherein the water content of the solution is reduced to <25% by weight.

* * * * *